(12) United States Patent
Weissman et al.

(10) Patent No.: US 6,481,856 B1
(45) Date of Patent: Nov. 19, 2002

(54) LIGHT SAMPLING DEVICES AND PROJECTOR SYSTEM INCLUDING SAME

(75) Inventors: Yitzhak Weissman, Tel Aviv (IL); Yair Dankner, Kfar Saba (IL); Meir Aloni, Herzlia (IL)

(73) Assignee: Comview Graphics Ltd., Raanana (IL)

( * ) Notice: Subject to any disclaimer, the term of this patent is extended or adjusted under 35 U.S.C. 154(b) by 67 days.

(21) Appl. No.: 09/763,530

(22) PCT Filed: Jun. 27, 2000

(86) PCT No.: PCT/IL00/00373

§ 371 (c)(1),
(2), (4) Date: Feb. 26, 2001

(87) PCT Pub. No.: WO01/02877

PCT Pub. Date: Jan. 11, 2001

(30) Foreign Application Priority Data

Jun. 30, 1999 (IL) .................................................. 130721

(51) Int. Cl.[7] .............................................. G03B 21/14
(52) U.S. Cl. .............................. 353/98; 353/77; 353/122
(58) Field of Search ........................... 353/98, 97, 122, 353/77; 385/36, 47

(56) References Cited

U.S. PATENT DOCUMENTS

| | | | | |
|---|---|---|---|---|
| 4,021,099 A | * | 5/1977 | Kawasaki et al. | ............. 385/35 |
| 4,360,275 A | * | 11/1982 | Louderback | ................ 356/446 |
| 5,146,516 A | * | 9/1992 | Blumke et al. | ................ 385/36 |
| 5,479,543 A | * | 12/1995 | Black | ........................... 385/31 |
| 6,082,865 A | * | 7/2000 | Yamazaki | ................... 353/122 |

* cited by examiner

Primary Examiner—William Dowling
(74) Attorney, Agent, or Firm—G.E. Ehrlich Ltd.

(57) ABSTRACT

Optical apparatus includes a source light a reflector having a reflecting face on one side facing the source of light to receive light therefrom, a small interruption in the reflecting face, and a sampling device located on the opposite side of the reflector aligned with the small interruption for extracting a sample of the light received by the reflecting face.

27 Claims, 3 Drawing Sheets

LIGHT SAMPLING DEVICES AND PROJECTOR SYSTEM INCLUDING SAME

FIELD AND BACKGROUND OF THE INVENTION

The present invention relates to light sampling devices for producing a sample of light from an optical device, e.g., for control or other processing purposes. The invention is especially useful in an image projector system including a plurality of image projectors, wherein the light samples produced by each projector are used for controlling the image projectors, e.g., to compensate for variations in color composition, light intensity, etc. The invention is therefore described below with respect to this application, but it will be appreciated that the invention could also be used in other applications where it's desired to take samples of light from an optical device for other control or processing purposes.

Many types of optical devices contain mirrors to manipulate light beams or other light source. In contrast to other common optical elements such as lenses, mirrors generally confine the light to the reflecting side only. This provides a relatively easy access to the light beam with minimal perturbation or interference.

The present invention takes advantage of this fact to sample the reflected light beam for purposes of controlling or improving the functioning of the apparatus, or for other purposes. Examples of other purposes in which it is desirable to provide a sample of the light beam include illumination control, noise reduction, optical tracking, optical alignment, and conditioning of image forming devices. The latter application can include cameras, projectors, scanners, printers, etc. The conditioning can be color or intensely balancing, correction of geometric distortions, etc.

The invention is particularly useful, and is therefore described below, in a large scale display system.

Display systems based on a single image generator are limited in the number of pixels they can display (currently the limit is approximately one million), and in their brightness (the amount of light emitted from a unit image area). In order to exceed these limits, it is necessary to combine several image generators to create a single image, for example, by arranging a plurality of image projectors with their screens arrayed in a side-by-side array to produce a combined display. The quality of the resulting image, however, critically depends on the ability to suppress discontinuities that naturally arise at the boundaries of the individual image generators because of variations, (e.g., in color, light intensity, etc.) in the individual image generators. These variations exist initially among the individual image generators, and also tend to change with time.

In general, light sampling devices create disturbances to the image, or other form of light, emanating from the light source. If the light sampling device is located in a light projector between the light source and the screen, the disturbances are mostly in the form of a shadow; and if the light sampling device is between the viewer and the screen, the disturbance is usually in the form of an obstruction.

If a light sampling devices has to be removed when the image is displayed or the light emanating from the light source is otherwise processed, the light sampling procedure would be considerably complicated, and the cost would be considerably increased.

OBJECTS OF THE INVENTION

An object of the present invention is to provide a light sampling device which may be applied to an optical apparatus, such as an image projector, in a relatively convenient manner and at a relatively low cost.

Another object of the invention is to provide such a light sampling device which minimizes the interference with the projected image or other normal use of the light emanating from the light source.

A further object of the invention is to provide an optical apparatus with a light sample device which extracts a required sample of light with a minimum of interference with the normal operation of the optical apparatus.

BRIEF SUMMARY OF THE INVENTION

According to one aspect of the present invention, there is provided optical apparatus, comprising: a source of light; a reflector having a reflecting face on one side facing the source of light to receive light therefrom, the reflecting face having a small interruption therein; and a sampling device located on the opposite side of the reflector aligned with the small interruption therein for extracting a sample of the light received by the reflecting face.

According to one preferred embodiment described below, the small interruption is a small hole through the reflector and reflecting face, and the sampling device is an optical fiber having one end received in the small hole from the opposite side of the reflector.

In another preferred embodiment described below, the small interruption in the reflecting face of the reflector is in the form of a narrow slit therein; and the light sampling device includes a light prism fixed to the opposite side of the reflector.

More particularly, according to further features in this described preferred embodiment, the light prism includes an inlet face parallel to and in contact with the opposite side of the reflector and aligned with the small interruption in the reflecting face, to receive the sample of light therefrom; an inclined face for reflecting the sample of light therefrom; and an outlet face through which the sample of light is transmitted. The light sampling device further includes an optical fiber at the opposite face of the prism, and an optical cube for coupling one end of the optical fiber to the outlet face of the prism. In addition, the optical fiber extends along and parallel to the opposite face of the reflector.

This embodiment of the invention provides a number of advantages. Thus, since the optical fiber extends parallel to the reflector, the light sampling device can be installed very conveniently and compactly on the image projector. In addition, the slit in the reflecting face can be much smaller than the cross-sectional area of the optical fiber, thereby minimizing the interference produced by the light sampling device to the viewed image.

A third preferred embodiment is described wherein the light sampling device includes an optical fiber having an end fixed to the opposite side of the reflector in alignment with the interruption and cut at an angle to make abutting contact with the opposite side of the reflector. In this embodiment, the end of the optical fiber is fixed by an apertured supporting member fixed to the opposite side of the reflector and receiving the optical fiber end.

As indicated earlier, the invention is particularly useful in image projectors and projector systems, in which cases, the source of light would be an image generator.

According to another aspect of the present invention, therefore, there is provided an image projector, comprising: an image generator for generating an image to be projected; a screen for screening the image; and a reflector having a reflecting face facing the image generator for reflecting the image generated thereby onto the screen; the reflecting face of the reflector having a small interruption therein; the opposite side of the reflector, opposite to the reflecting face, including a light sampling device aligned with the small interruption for extracting a sample of light therefrom.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF PREFERRED EMBODIMENTS

Figure 1:
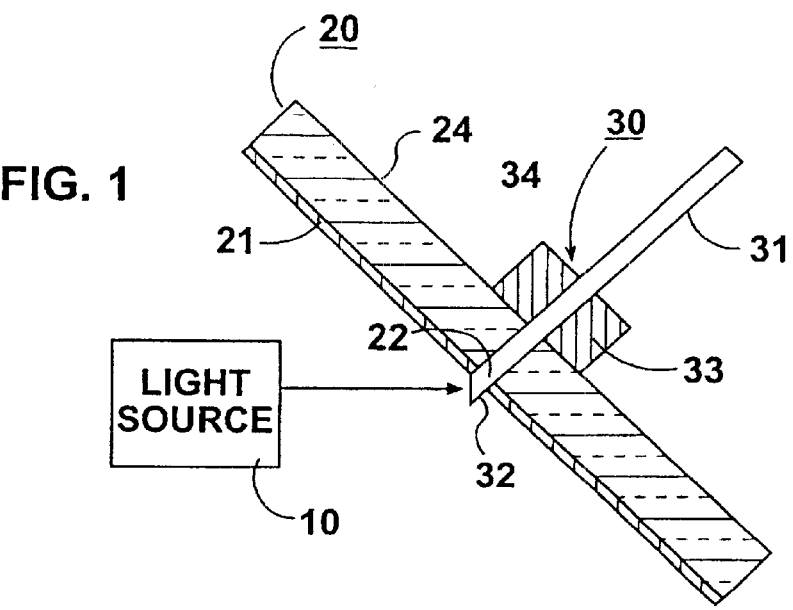
FIG. 1 illustrates one form of light sampling device constructed in accordance with the present invention for use in various types of optical apparatus.

FIG. 1 illustrates one form of sampling device, namely feed-through device, constructed in accordance with the present invention. The sampling device illustrated in FIG. 1 is for use in apparatus which includes a light source 10 directed towards a reflector, generally designated 20. A sampling device, generally designated 30, is located on the side of the reflector opposite to that of the light source 10 so as not to interfere with the light emanating from the light source and directed towards the reflector.

The side OF reflector 20 facing light source 10 has a reflecting face 21 for reflecting the light emanating from the light source. Reflecting face 21 has a small interruption 22 therein, with which the sampling device 30 is aligned for extracting a sample of the light received on the reflecting face 21.

In the embodiment illustrated in FIG. 1, the interruption 22 in the reflecting face 21 is in the form of a small hole extending completely through the reflector 20 from its reflecting face 22 to its opposite side which has a non-reflecting face 24. The sampling device 30 includes an optical fiber 31 having one end received in the hole 22 and extending therethrough from the opposite face 24 of the reflector. The end face 32 of the optical fiber 31 is cut at an angle and polished in order to optimize the coupling with light, particularly collimated light, coming in a particular direction from the light source 10.

The light sampling device 30 illustrated in FIG. 1 further includes a supporting member 33 formed with a bore 34 therethrough for receiving the optical fiber 31 and for supporting it within hole 23 through the reflector 20. The fiber supporting member 33 is fixed to the opposite face 24 of the reflector 20, as by the use of a suitable adhesive.

Figure 2:
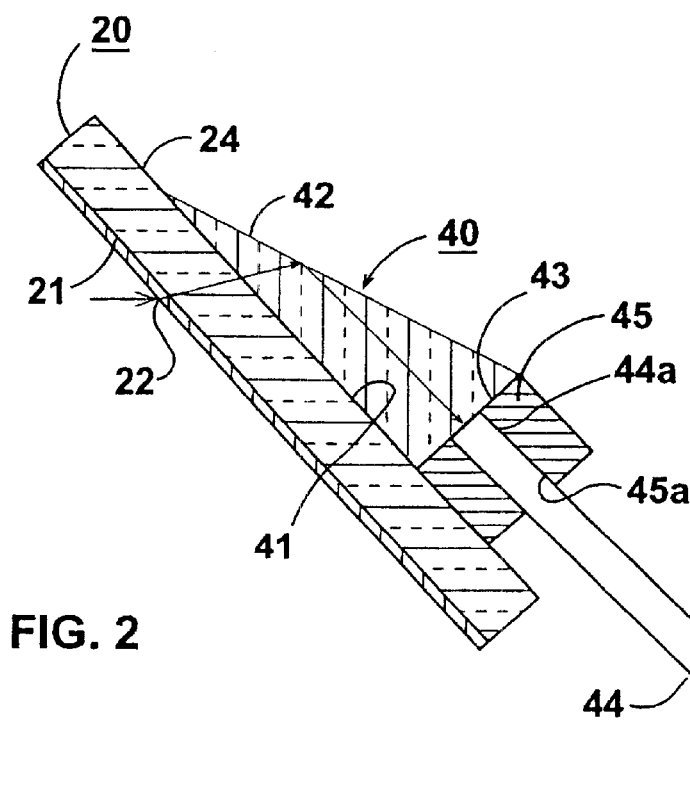
FIG. 2 illustrates another form of light sampling device including a light prism and an optical cube.

FIG. 2 illustrates another arrangement wherein the light sampling device includes a prism, generally designated 40, fixed to the non-reflecting face 24 of the mirror 20. Prism 40 includes an inlet face 41 parallel to and in contact with the non-reflecting face 24 of mirror 20 in alignment with the interruption 22 (in the form of a slit) in the reflecting face to receive the sample of light from the light source (10, FIG. 1). Prism 40 further includes an incline face 42 for reflecting the sample of light therefrom, and an outlet face 43 perpendicular to the inlet face 41, through which the sample of light is transmitted to an optical fiber 44 via an optical cube 45 at the outlet face 43 of the prism.

All the foregoing optical faces of the prism and the fiber are polished. The inlet end of the optical fiber 44 is inserted through a hole 45a formed through the optical cube 45, and is bonded with an appropriate adhesive, such that the end face 44a of the optical fiber 44 is exposed to the light transmitted through the prism. As seen in FIG. 2, the optical fiber 44 extends along and parallel to the non-reflecting face 24 of the reflector.

Since the light direction is parallel to the longitudinal axis of the optical fiber 44, the fiber end face 44a receiving the light from the prism 40 is perpendicular to the fiber axis, which permits simple polishing of the fiber end face 44a. Also, since the prism 40 is applied firmly against the reflector 20, and the optical fiber 44 extends parallel to the reflector, the described arrangement permits a very compact construction with a minimum of volume in order to extract a sample of the light from the light source (10, FIG. 1). Also, since the slit 22 in the reflecting face 21 of the reflector 20 can be very small, the appearance of the light sampling device in the viewed image is minimized.

Figure 3:
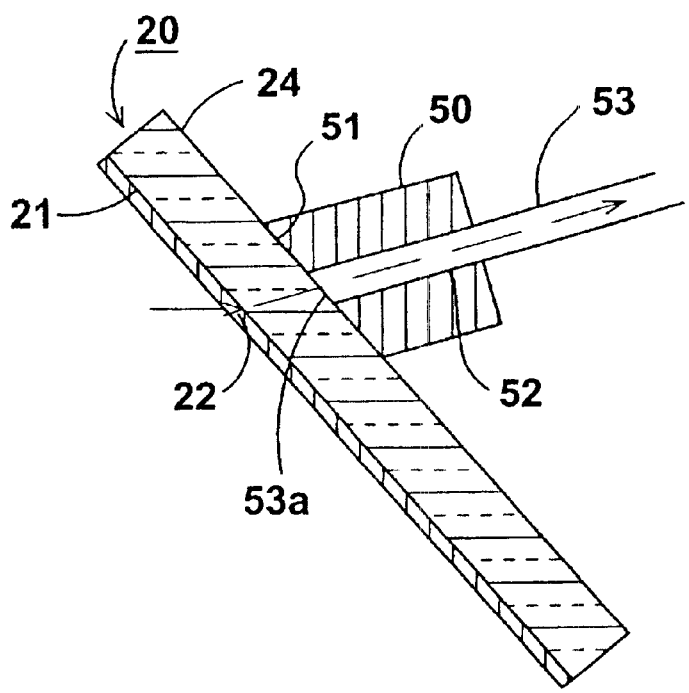
FIG. 3 illustrates a further form of light sampling device.

FIG. 3 illustrates a still further arrangement for sampling the light from reflector 20. In this case, the light sampling device is in the form of a supporting member 50 cut at one end with a slanting face 51 secured to the non-reflecting face 24 of the reflector 20. Supporting member 50 is further formed with a bore 52 receiving an optical fiber 53 having an end face 53a cut at the same angle as face 51 of the fiber support 50.

Figure 4:
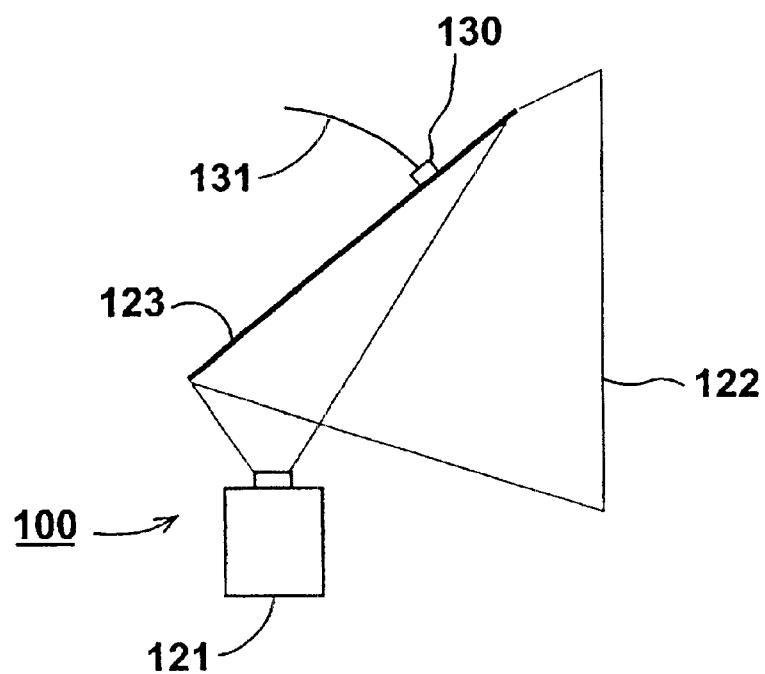
FIG. 4 diagrammatically illustrates an image projector including a light sampling device in accordance with the present invention.

FIG. 4 illustrates the light sampling device of FIG. 1 used for sampling light in a projector system, generally designated 100, including a light projector 121 which projects an image onto a screen 122 via a reflector 123. As in FIG. 4, the light sampling device 130 is applied to the non-reflecting side of the reflector 123, and includes an optical fiber 131 for extracting a sample of the light from the image projector 121.

Figure 5:
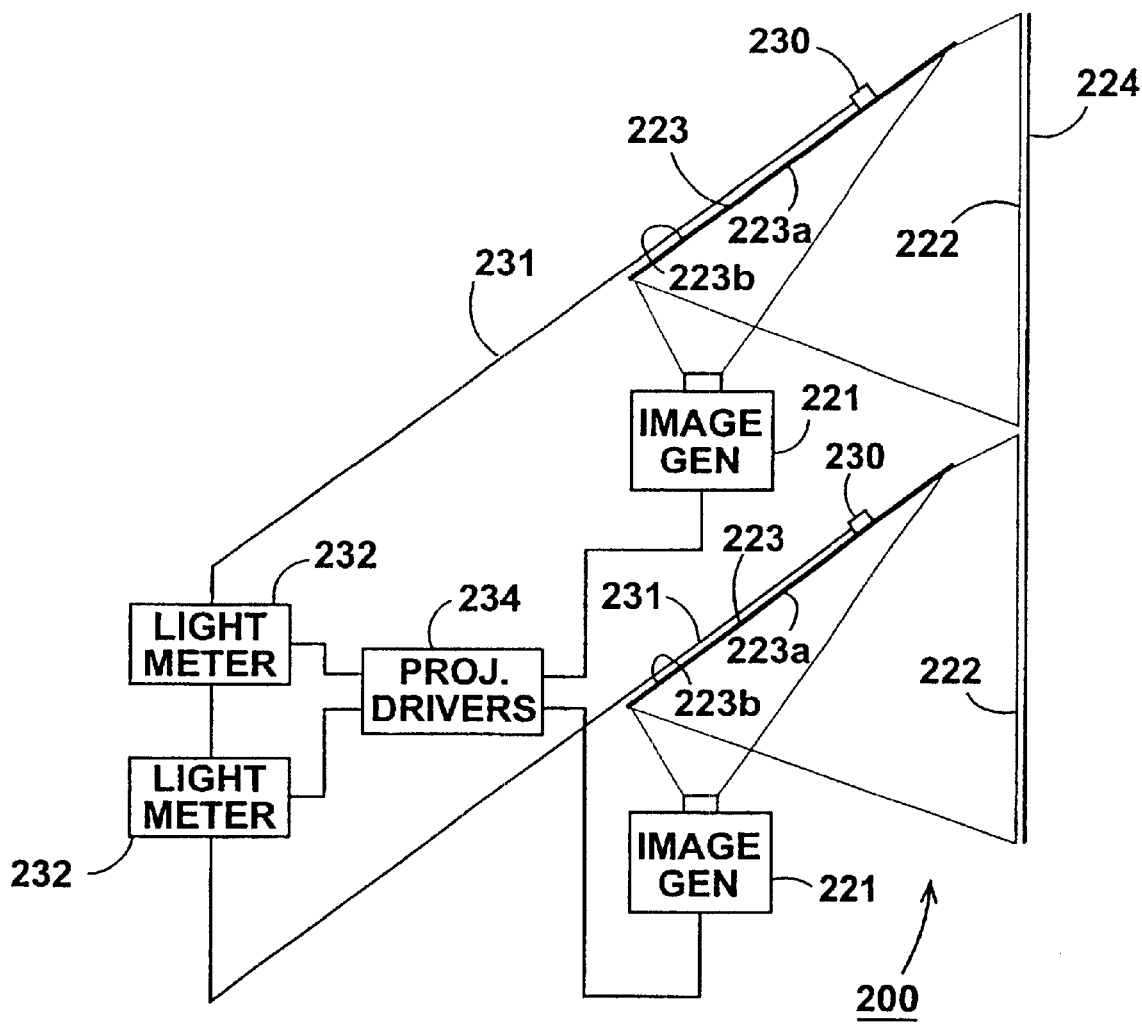
FIG. 5 illustrates an image projector system including a plurality of image projectors each having a light sampling device in accordance with the present invention for producing a combined display.

FIG. 5 illustrates an image projector system, generally designated 200, including a plurality of image projectors 221 having screens 222 arranged in a side-by-side array to produce a combined display when viewed from the front, e.g., via a large screen 224. While FIG. 5 illustrates only two such image projectors, it will be appreciated that the projector system could include any desired number, for example in a 2×2 array, a 3×3 array, etc., according to the desired overall size of the combined display.

In FIG. 5, the reflecting sides 223a of the reflectors 223 face the large screen 224, while the light sampling device 230 for each image projector is applied to the non-reflecting side 223b of the respective reflector 223. In this case, the light sampling device for each projector is of the prism type shown in FIG. 2 for extracting the sample of light via an optical fiber 231. As described above with respect to FIG. 2, the optical fiber 231 extends along and parallel to the non-reflecting face 223b of the reflector in each projector to a light metering device 232 which controls the projector drivers 234 of the image generators 221.

It will be appreciated that the interruption (22) in the reflecting face can be not only in the form of an interruption in the reflecting face, but also in the form of a sufficiently thin reflecting coating such that it is partially transmissive at this interruption.

While the invention has been described with respect to several preferred embodiments, it will be appreciated that these are set forth merely for purposes of example, and that many other variations, modifications and applications of the invention may be made.

What is claimed is:

1. Optical apparatus, comprising:

a source of light;

a reflector having a reflecting face on one side facing said source of light to receive light therefrom, said reflecting face having a small interruption therein;

and a sampling device located on the opposite side of said reflector aligned with said small interruption therein for extracting a sample of the light received by said reflecting face.

2. The apparatus according to claim 1, wherein said small interruption is a small hole through said reflector and reflecting face, and said sampling device is an optical fiber having one end received in said small hole from said opposite side of the reflector.

3. The apparatus according to claim 2, wherein the end face of said optical fiber at said one end is cut at an angle and polished.

4. The apparatus according to claim 3, wherein said optical fiber is supported in said hole by an apertured supporting member fixed to said opposite side of the reflector and receiving the optical fiber end.

5. The apparatus according to claim 1, wherein said small interruption in the reflecting face of the reflector is in the form of a narrow slit therein.

6. The apparatus according to claim 5, wherein said light sampling device includes a light prism fixed to said opposite side of the reflector.

7. The apparatus according to claim 6, wherein said light prism includes:
   an inlet face parallel to and in contact with said opposite side of the reflector and aligned with said small interruption in the reflecting face, to receive the sample of light therefrom;
   an inclined face for reflecting said sample of light therefrom;
   and an outlet face through which said sample of light is transmitted.

8. The apparatus according to claim 7, wherein said light sampling device further includes an optical fiber at said outlet face of the prism.

9. The apparatus according to claim 8, wherein said light sampling device further includes an optical cube for coupling one end of said optical fiber to said outlet face of the prism.

10. The apparatus according to claim 8, wherein said optical fiber extends along and parallel to said opposite side of the reflector.

11. The apparatus according to claim 1, wherein said light sampling device includes an optical fiber having an end fixed to the opposite side of said reflector in alignment with said interruption and cut at an angle to make abutting contact with said opposite side of the reflector.

12. The apparatus according to claim 11, wherein said end of the optical fiber is fixed to said opposite side of the reflector by an apertured supporting member fixed to said opposite side of the reflector and receiving the optical fiber end.

13. The apparatus according to claim 1, wherein said source of light is an image generator which projects an image, via said reflector, onto a screen.

14. An image projector, comprising:
    an image generator for generating an image to be projected:
    a screen for screening the image;
    and a reflector having a reflecting face on the side thereof facing the image generator for reflecting the image generated thereby onto said screen;
    said reflecting face of the reflector having a small interruption therein;
    the opposite side of the reflector, opposite to said reflecting face, including a light sampling device aligned with said small interruption for extracting a sample of light therefrom.

15. The projector according to claim 14, wherein said small interruption is a small hole through said reflector and reflecting face, and said sampling device is an optical fiber having one end received in said small hole and extending from said opposite side of the reflector.

16. The projector according to claim 15, wherein the end face of said optical fiber at said one end is cut at an angle and polished.

17. The projector according to claim 16, wherein said optical fiber is supported in said hole by an apertured supporting member fixed to said opposite side of the reflector and receiving the optical fiber end.

18. The projector according to claim 14, wherein said small interruption in the reflecting face of the reflector is in the form of a narrow slit therein.

19. The projector according to claim 18, wherein said light sampling device includes a light prism fixed to said opposite side of the reflector.

20. The projector according to claim 19, wherein said light prism includes:
    an inlet face parallel to and in contact with said opposite side of the reflector and aligned with said small interruption in the reflecting face, to receive the sample of light therefrom;
    an inclined face for reflecting said sample of light therefrom;
    and an outlet face through which said sample of light is transmitted.

21. The projector according to claim 20, wherein said light sampling device further includes an optical fiber at said outlet face of the prism.

22. The projector according to claim 21, wherein said light sampling device further includes an optical cube for coupling one end of said optical fiber to said outlet face of the prism.

23. The projector according to claim 21, wherein said optical fiber extends along and parallel to said opposite side of the reflector.

24. The projector according to claim 14, wherein said light sampling device includes an optical fiber having an end fixed to the opposite side of said reflector in alignment with said interruption and cut at an angle to make abutting contact with said opposite side of the reflector.

25. The projector according to claim 24, wherein said end of the optical fiber is fixed to said opposite face of the reflector by an apertured supporting member fixed to said opposite face of the reflector and receiving the optical fiber end.

26. The projector according to claim 14, wherein said source of light is an image generator which projects an image, via said reflector, onto a screen.

27. An image projector system, comprising:
    a plurality of image projectors each according to claim 14, the screens of the image projectors being in a side-by-side array to produce a combined display;
    and a control system for receiving said light samples from the light sampling devices of said image projectors and for controlling the image projectors in accordance therewith.

* * * * *